Feb. 16, 1965    H. F. CONDON    3,169,847
APPARATUS FOR MAKING SMOOTH-SURFACED
PRECISION-END TUBULAR ARTICLES
Filed June 28, 1961    4 Sheets-Sheet 1
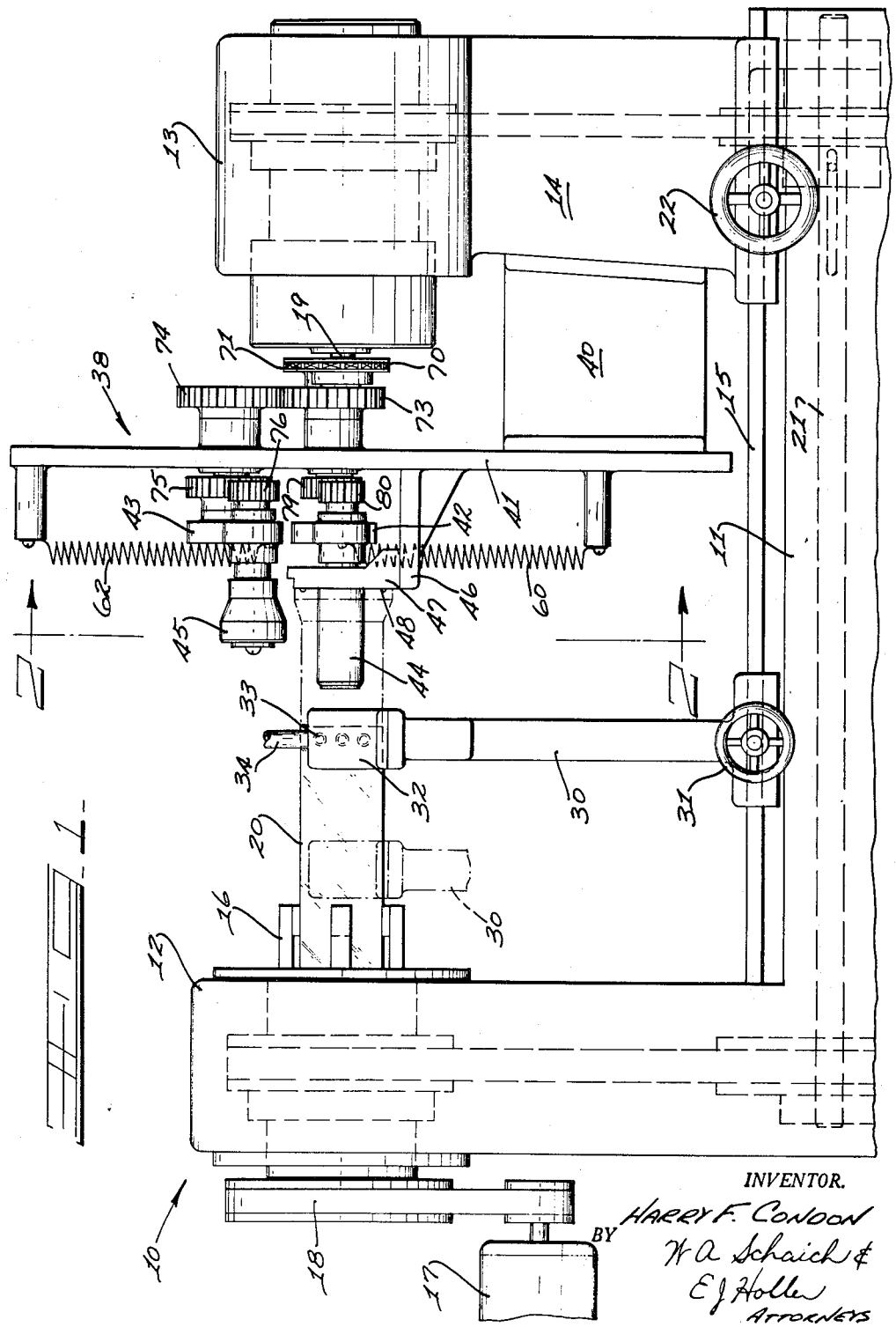
INVENTOR.
HARRY F. CONDON
BY W. A. Schaich &
E. J. Holler
ATTORNEYS

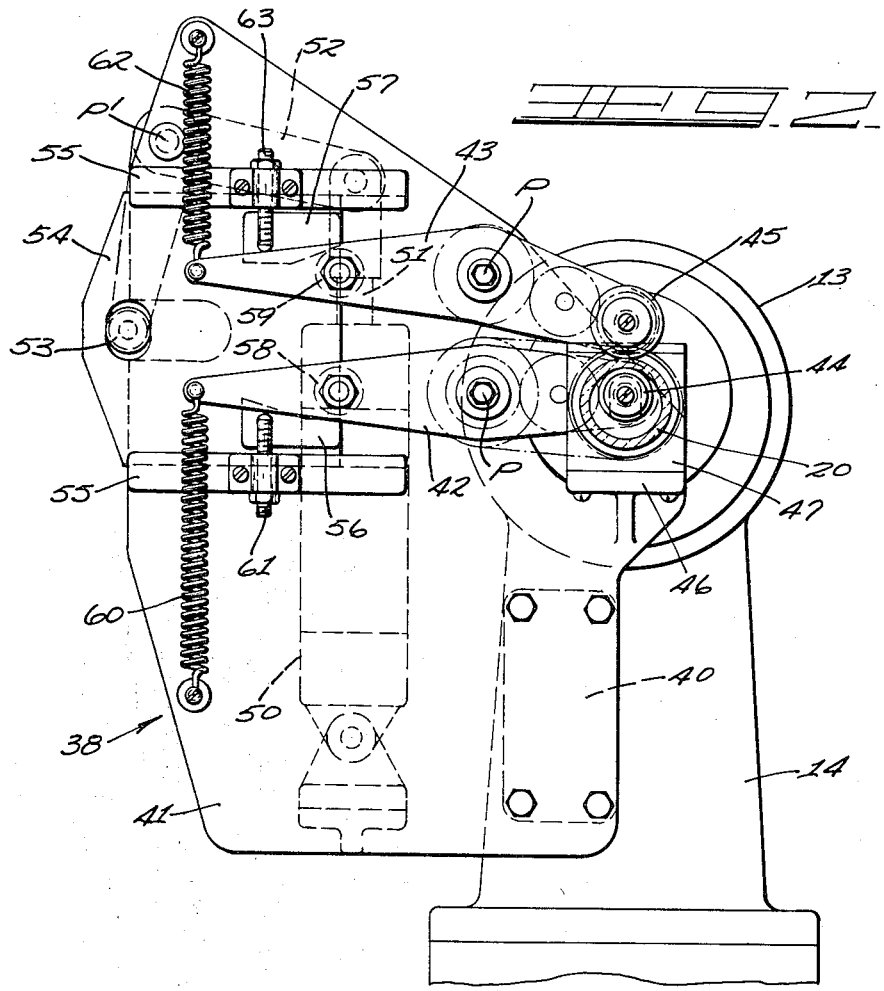
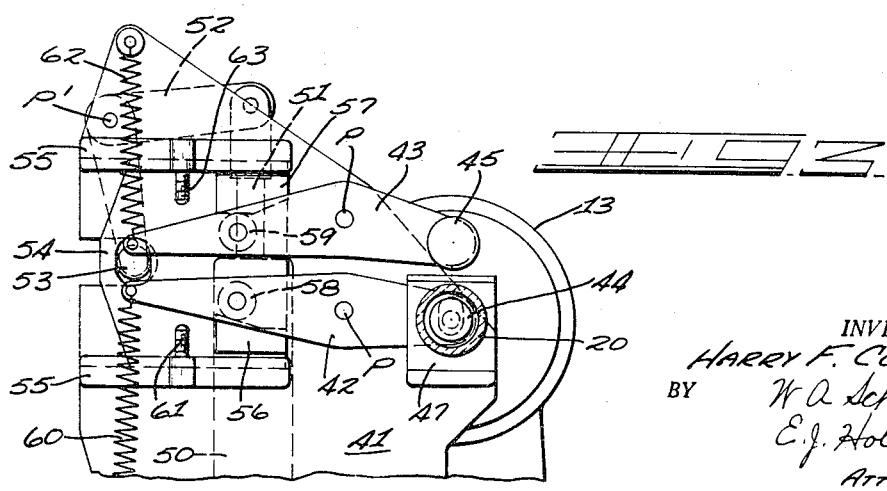

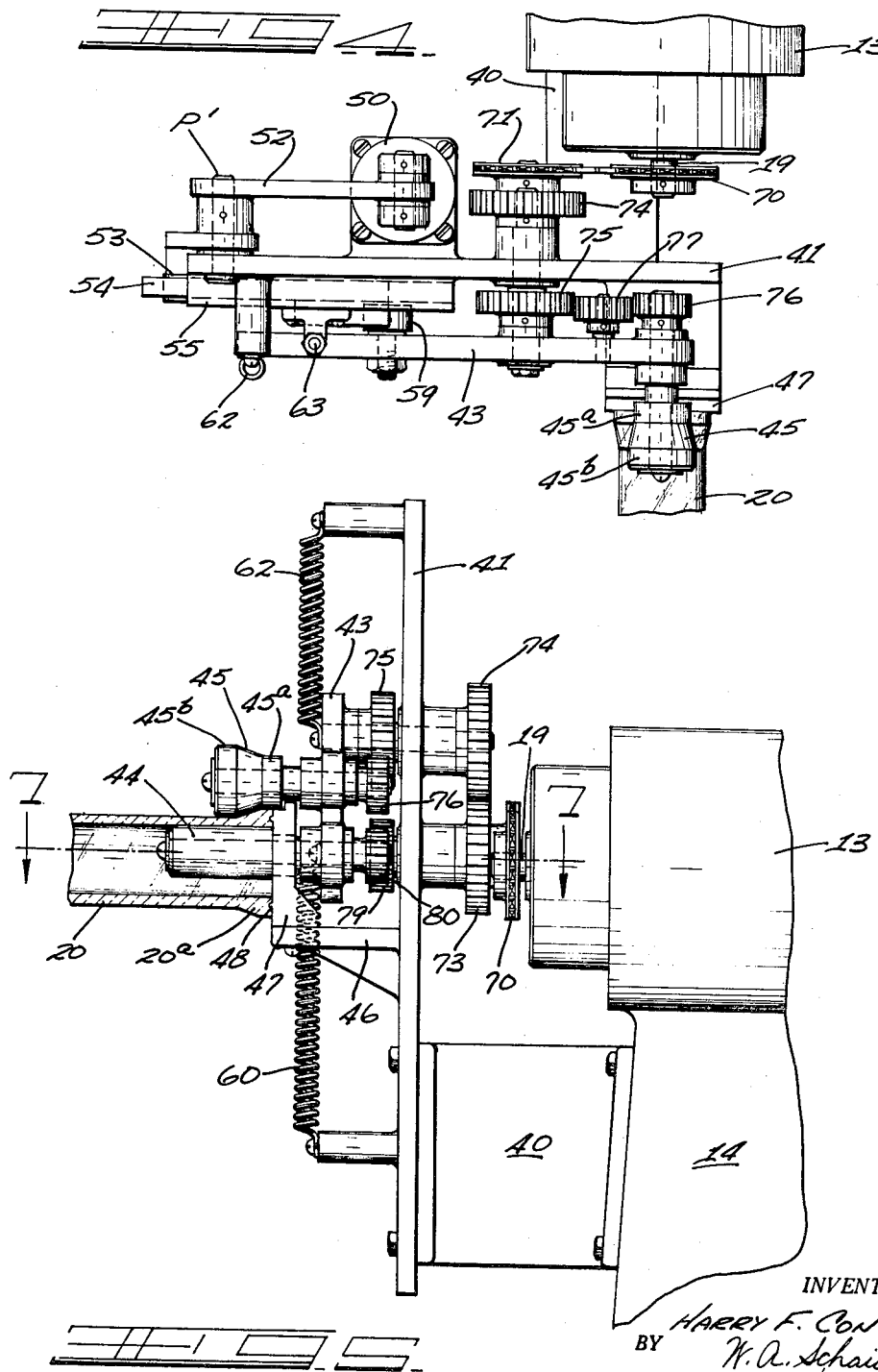

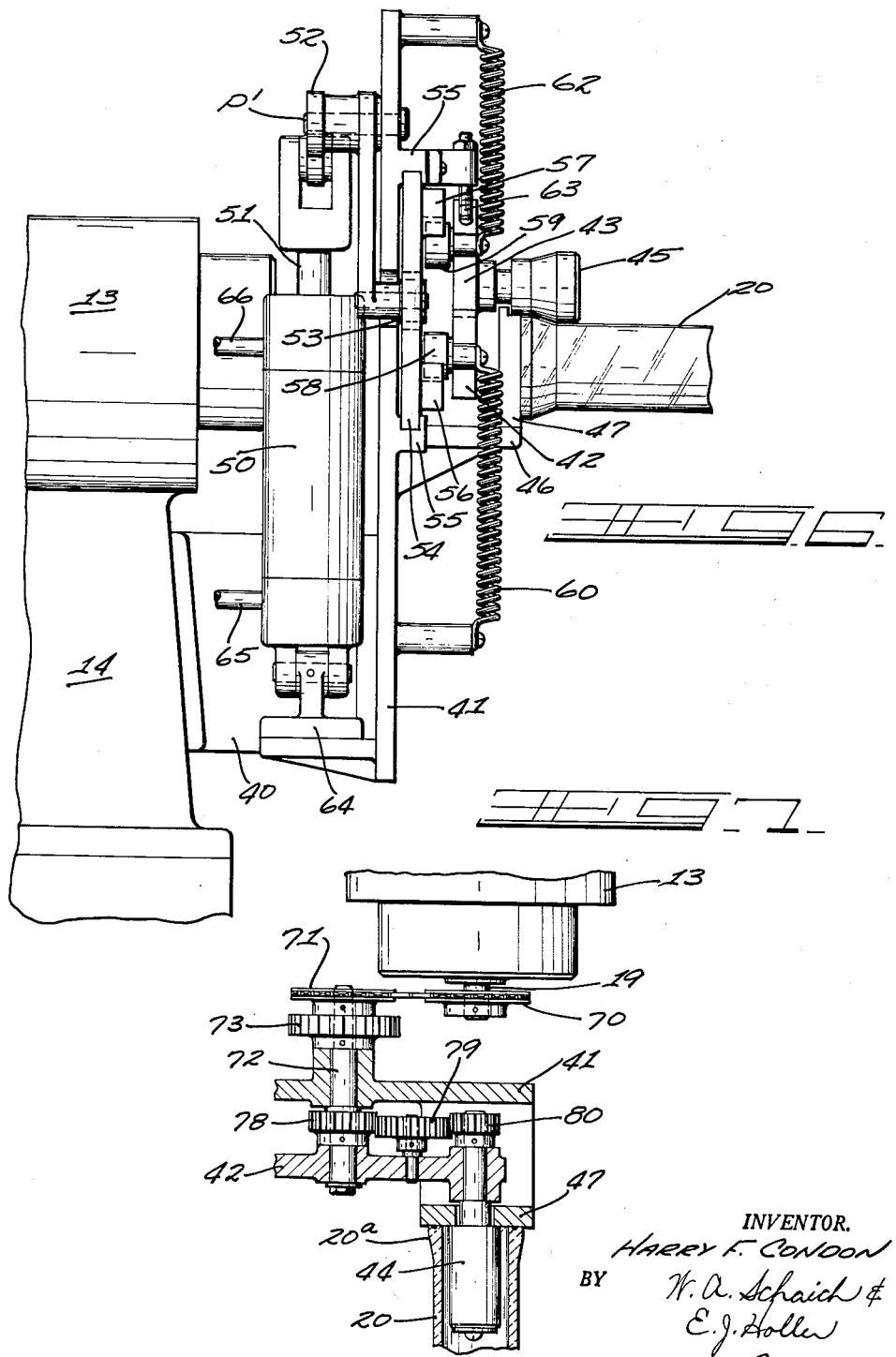

United States Patent Office 3,169,847
Patented Feb. 16, 1965

3,169,847
APPARATUS FOR MAKING SMOOTH-SURFACED PRECISION-END TUBULAR ARTICLES
Harry F. Condon, Sylvania, Ohio, assignor, by mesne assignments, to Owens-Illinois Glass Company, Toledo, Ohio, a corporation of Ohio
Filed June 28, 1961, Ser. No. 120,286
4 Claims. (Cl. 65—282)

The present invention relates to an apparatus for making smooth-surfaced precision-end pipe, tubing, fittings or the like of glass or other thermoplastic material. More specifically, the invention pertains to an apparatus for forming tubular workpieces with precise end contours having smooth surfaces and particularly to glass pipe sections, tubing and fittings with enlarged flanged ends with such characteristics.

Previously in the manufacture of glass pipe, tubes and fittings which are formed having similar thickened flared ends for interchangeable connection, the end portion of a tubular glass blank has been heated to plasticity and then flared outwardly by a forming tool inserted into the hot end of the blank. The tubular blank is continuously rotated during tooling of the plastic glass to the desired contour. If the end portion of the glass blank has initial characteristics of being eccentric or out-of-round or varying wall thickness of any appreciable extent, adequate control over the finally-produced flared end is unobtainable or extremely difficult to obtain in producing a high-quality glass product. It is well-known that during forming the temperature of the glass and forming tools must be maintained within required working limits to prevent the tools from checking or abrading the contacted glass surfaces which results in loss of product or producing a poor-quality finish.

Thus, producing glass pipe sections having required heavy wall thickness by tooling the ends of relatively large sizes of tubing blanks into heavy flared ends having precisely-controlled dimensions, contours and surface finish has been considered impractical of attainment by previous tooling techniques. When the heat-softened glass such as borosilicate having considerable mass and dimensions is rotated and contacted by conventional flaring tools, the end portion is frequently twisted or distorted when forming pressures are applied by the flaring tools causing a loss of product.

In order to overcome such objections one process for producing 4 to 6 inch internal diameter sizes of glass pipe and fittings consists of press-molding a cup-shaped hollow glass article in a suitable mold, severing the hollow cup-shaped article at an intermediate sidewall region to form a cylindrical sleeve having one end formed with the required thickened flange. Its other end is then butt-welded to the end of a right-cylindrical glass blank or tube having equivalent diameters. Obviously such operations as pressing, severing and uniting by fusion welding in forming large-size glass pipes and fittings are considerably more involved and costly than simply reheating and re-shaping the end portion of a tubular blank into a thickened flange of desired precisely-accurate contour in the prescribed manner described hereinbelow.

Accordingly, it is an object of the present invention to provide an improved apparatus for shaping the end portion of a heavy-walled tubular article of thermoplastic material into a terminating thickened end flange.

Another object of this invention is to provide a novel apparatus for producing thickened flanges on the ends of heavy-walled glass tubing, the flanges having precisely-formed contours and dimensions closely approaching the original glass surface finish such as 0 to 5 microinch.

Another object of this invention is to provide an apparatus for conjunctively forming both the internal and external surfaces of the flanged end of a relatively heavy-walled glass tube, the internal glass surface being maintained with essentially its original contour and the external surface being formed with a circular generally divergent flaring contour terminating in a transverse sealing edge having a substantially greater width than the tube sidewall thickness.

A further object of the present invention is to provide apparatus for forming an end portion of a glass tube with precisely-accurate internal and external contours having uniformly smooth surface characteristics.

A further object of the invention is to provide apparatus for forming a tubular workpiece of glass or other thermoplastic material with an enlarged flange and having an internal contour which is complemental to the original surfaces of the workpiece and an external contour which is outwardly flaring with a precise cylindrical shape.

A still further object of this invention is to provide combined apparatus for forming a uniformly-shaped enlarged end flare on a tubular glass article with self-lubricating juxtaposed internal and external rotatable shaping members adapted to rotate at the same peripheral speed of rotation as the contacted surfaces and to apply controlled forming pressure to the heat-softened end portion during axial rotation of the article.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

On the accompanying drawings:

FIG. 1 is a side elevational view of apparatus embodying the invention showing a tubular glass workpiece during an initial preheating stage in solid outline and in final form in broken outline.

FIG. 2 is a vertical sectional view of a portion of FIG. 1, looking in the direction indicated by the line 2—2 showing the rotatable shaping members of the apparatus in contact with the tubular workpiece during the flaring operation.

FIG. 3 is a fragmentary view similar to FIG. 2 showing the shaping members prior to contacting the workpiece.

FIG. 4 is a fragmentary plan view of that portion of the apparatus shown in FIG. 2 illustrating the driving mechanism for rotating the pair of shaping members.

FIG. 5 is a fragmentary side elevational view of the apparatus shown in FIG. 4, the workpiece being shown in vertical section during a final stage of end forming.

FIG. 6 is a view similar to FIG. 5 from the reverse side showing the operative means for moving the pair of rotatable shaping members into and out of contact with the workpiece.

FIG. 7 is a fragmentary horizontal sectional view taken along the line 7—7 of FIG. 5 showing the mechanism for driving the internal shaping member.

According to the present invention a tubular blank of thermoplastic material to be formed is mounted in a suitable chuck with its end portion in freely cantilevered relation. The tubular blank is rotated axially while its free end is heated to plasticity. After the end portion becomes plastic it is formed by inserting a rotatable cylindrical forming tool or roller into the end portion, the roller having sufficient longitudinal extent to contact both heat-softened and essentially rigid internal surfaces of the blank. The external surfaces are then forcibly contacted by a contoured external forming roller. The forming rolls are preferably driven at the same peripheral speed of rotation as the contacted surfaces. The internal shaping roll is operative within a stationary end forming plate having an annular rib thereon which serves to form the terminating edge of the workpiece with an annular recess.

Both the internal and external shaping rolls which are capable of being moved laterally and simultaneously rotated are comprised of carbon-graphite containing material which is self-lubricating to permit wide latitude of thermal working limits with minimal checking or abrading of the contacted glass surfaces.

In the embodiments of the invention shown in FIGS. 1 to 7 inclusive, a glass working lathe shown generally in FIG. 1 and indicated by the reference numeral 10 is employed in practicing the invention. The lathe 10 includes a bed or frame 11, a headstock 12, and a tailstock 13. Headstock 12 is stationarily mounted on the bed or frame, while the tailstock 13 is mounted on a carriage 14 which is slidably disposed upon a pair of guide rails 15 extending longitudinally along the bed 11.

Headstock 12 is provided with a rotatable chuck 16 which is driven by an electric motor 17 through an endless belt 18 to rotate a tubular workpiece 20 about its axial center.

Tailstock 13 is provided with a rotatable shaft 19 which is mounted in alignment and driven in synchronism with headstock chuck 16 through a suitable series of interconnecting belts and pulleys and bed-plane drive shaft 21. Tailstock 13 is capable of being moved horizontally on guide rails 15 by a handwheel 22. All of the foregoing elements are known in the art as components of a conventional glassworking lathe.

A burner carriage 30 is slidably mounted on guide rails 15 of the lathe between headstock 12 and tailstock 13 and is capable of lateral movement by a second handwheel 31. Burner carriage 30 has a pair of burner blocks 32 at its upper end disposed on opposite sides and in horizontal alignment with the workpiece 20. Each block 32 has a plurality of burner nozzles 33 mounted in opposing relation facing the workpiece 20 to deliver impinging burner fires over its end portion. Burner nozzles 33 are supplied with a combustible gaseous fuel such as a mixture of gas and oxygen by an inlet line 34 connected to each block 32. Burner carriage 30 is capable of being moved horizontally such as adjacent to headstock chuck 16 after the end portion is heat-softened.

The end tooling mechanism designated by the numeral 38 is attached to and comprises a part of tailstock assembly. A support member 40 is rigidly attached to tailstock carriage 14 facing in the direction of the headstock. A vertically-disposed upright plate 41 is mounted on support member 40. A pair of pivotally-mounted arm members 42 and 43 are arranged on upright plate 41 in coplanar relation. Each arm member is pivotally movable around pivot point P as shown in FIG. 2 extending near the workpiece. Arm members 42 and 43 are mounted in vertical alignment with their major surfaces parallel to upright plate 41 and each serves to support one of the shaping rolls at a projecting end region. Lower arm member 42 has a rotatable shaping roll 44 attached to one end thereof and upper arm member 43 has a shaping roll 45 attached at a similar end position. Each of the shaping rolls 44 and 45 are comprised of self-lubricating, glass-working material and are mounted in cantilevered relation projecting in the direction of workpiece 20. Shaping rolls 44 and 45 are disposed in juxtaposition in vertical alignment adapted to engage an upper area of the workpiece end portion during its rotation.

A stationary horizontally-projecting plate 46 is mounted near the shaping rolls at one edge of upright plate 41 having an upright end-forming stop member 47 affixed thereto. End forming stop member 47 has a vertical working surface with an exteriorly-projecting annular rib 48. Rib 48 has a diameter equivalent to a central region of the terminating edge of the finally-formed end portion of the workpiece. Back-up plate 47 may be comprised of metallic material having a lubricating coating or non-metallic self-lubricating material similar to rolls 44 and 45.

Each of the shaping rolls 44 and 45 is mounted in a suitable bearing to permit its essentially friction-free rotation. Both rolls may be positively driven by the tailstock drive shaft 19 through a suitable gear train as described hereinbelow, or alternately, internal roll 44 is driven by friction on contacting the workpiece internal surface while external roll 45 is positively driven by the gear train. In either case internal roll 44 is driven at the same peripheral speed as the internal surface of the workpiece end portion and external roll 45 is driven at the same peripheral speed as its external surface.

After tubular workpiece 20 is chucked within headstock chuck 16 of the machine and rotated thereby, burner blocks 32 are brought into proximity with the workpiece end portion to heat the same into fully heat-softened workable condition. During this interval the lathe tailstock 13 carrying the shaping roll assembly 38 is retracted to the right, as shown in FIG. 1, some distance from burner blocks 32 and the emitting burner fires.

After the end portion of the workpiece is fully heat-softened, the tailstock of the lathe is moved from right-to-left, as shown in FIG. 1, into lateral alignment with the plastic formable end portion. Stop plate 47 which is mounted stationarily on the assembly is brought into near relationship but not in contact with the terminating edge of workpiece 20.

Air cylinder motor 50 which is mounted in vertical arrangement on a suitable bracket 64 at one side of upright plate 41 (FIGS. 2 and 4) is then operated to move its piston rod 51 downwardly. Inlet and outlet lines 65 and 66 for the motor 50 supply pressurized air or fluid to operate its piston. The upper end of piston rod 51 is connected to an L-shaped, pivotally-mounted lever arm 52 having a rotatable roller cam 53 on its downwardly-projecting end. Lever arm 52 is mounted to pivot around the point P′ and in FIG. 2 roller cam 53 is shown in its leftmost position in working arrangement with piston rod 51 in its lower position.

A rectangular flat cam plate 54 is mounted in movable relation in a pair of horizontal guide members 55 affixed to one side of upright plate 41. Cam plate 54 is moved back-and-forth laterally by roller cam 53, L-shaped arm 52 and air cylinder motor 50 to move shaping rolls 44 and 45 into and out of working relation. Cam plate 54 has a pair of juxtaposed bevel cams 56 and 57 mounted thereon in vertically-aligned positions. Lower arm member 42 has a freely-rotatable cam follower 58 mounted thereon adapted to be engaged by lower bevel cam 56 of plate 54. Upper arm member 43 has a similar cam follower 59 mounted thereon adapted to be contacted by bevel cam 57.

Upon movement of cam plate 54 from right-to-left (FIGS. 2 and 3), the beveled surface of cam 56 separates from cam follower 58 on arm 42 which is then pivoted counterclockwise to move internal roll 44 into contact with the inner surface of the workpiece end portion. The length of internal roll 44 is sufficient to extend into direct physical contact with an adjacent unsoftened area of the end portion which area is employed to guide the end forming operation. Roll 44 is freely rotatable so that it may frictionally engage the inner surface of the workpiece and be rotated thereby, or alternatively, be positively driven at the proper peripheral speed by the tailstock. A spring 60 mounted in tension serves to turn arm member 42 pivotally to move shaping roll 44 upwardly into contact with the workpiece internal surface. A stop member 61 is employed to prevent internal roll 44 from moving upwardly to such extent as to contact annular rib 48 of stationary backup plate 47.

On further movement of upright cam plate 54 from right-to-left as shown in FIGS. 2 and 3, bevel cam 57 separates from contact with cam follower 59 on arm member 43 to move external shaping roll 45 downwardly into contact with the exterior surface of the workpiece end portion. Thus, external roll 45 is brought into contact with the workpiece exterior immediately following movement of internal roller 44 into contact with the workpiece interior. A spring 62 mounted in tension serves to turn arm member 43 pivotally clockwise and a stop member 63 serves to limit the downward movement of external roll 45 by its contacting the arm member.

Spring 60 which is connected to the opposite end of lower arm member 42 has considerably greater strength than spring 62 which is connected to a similar end of upper arm member 43. It is preferred that spring 60 have a strength in tension which is approximately twice that of spring 62. A pair of air or pneumatic cylinders individual to each arm member 42 and 43 can also be substituted for tension springs 60 and 62 to apply forming pressure to the glass tube.

Roll 44 has a right-cylindrical contour and roll 45 has a substantially frusto-conical contour with cylindrical end surfaces. The smaller cylindrical surface 45a of external roll 45 is maintained out of contact with the upper edge of backup plate 47 and the spacing between surface 45a and internal roll 44 in near relation is essentially equivalent to the width of the workpiece formed edge. The larger cylindrical surface 45b is spaced from internal roll 44 a distance substantially equivalent to the workpiece normal sidewall thickness. The central frusto-conical surfaces of roll 45 have an angle of taper equal to the outward flare to be formed on the end portion.

With center roll 44 in engagement with the internal surface of the workpiece and external roll 45 being driven at the same peripheral speed as its external surface, the workpiece is rotated with rotating rolls 44 and 45 working the glass until upper arm member 43 is stopped from further pivotal movement by making contact with upper stop member 63. Thus, upper external arm roll 45 is controlled in its lower-most working position. Limit stop 63 serves to provide a true circular shape or configuration to the exterior surface of the flanged end by maintaining roll 45 stationarily at its lowermost position during final tooling.

After the flange is fully formed, air cylinder 50 is operated in the reverse direction so that piston rod 51 is moved upwardly. L-shaped arm 52 is rotated counter-clockwise thereby to move cam plate 54 from left-to-right (FIG. 3) to remove the shaping rolls 44 and 45 from contact with the glass. Upper roll 45 initially separates from the glass following which lower internal roll 44 is lowered into essentially coaxial alignment with the workpiece. The tailstock is then backed away from the workpiece and the article is essentially fully formed.

In forming relatively heavy-walled large diameter glass tubes such as those having three, four or six inch internal diameters, the heat-softened end portion may be formed stepwise. During an initial tooling period the end portion is given a slightly enlarged contour and the entire space between shaping rolls 44 and 45 and backup plate 47 is not fully filled by the heated glass. After some preliminary shaping air cylinder motor 50 is operated to move cam plate 54 from left-to-right (FIG. 3) to disengage the shaping rolls from contact with the glass. Tailstock 13 is then retracted from left-to-right (FIG. 1) from proximity with the partially-formed end portion which is again heat-softened by the burner fires.

With the end portion again heat-softened the thickened flanged end is fully formed by bringing shaping rolls 44 and 45 into contact with the glass which is further formed as described hereinabove. The shaping rolls are highly polished having essentially the same surface finish as the original glass as drawn. The backup plate 47 of the tailstock is moved from right-to-left a sufficient distance so that annular rib 48 contacts the glass and forms an annular groove or recess in its terminating edge surface.

After the tailstock assembly including rolls 44 and 45 and backup plate 47 are removed from the vicinity of the workpiece, burner carriage 30 is again brought into alignment with the end portion and the burner fires are ignited to glaze the newly-formed flanged end 20a. The glazing serves to remove any minor tooling marks or imperfections which may have resulted from the tooling operation.

Both roll 45 and roll 44 are driven from drive shaft 19 of the tailstock by a pair of 1:1 ratio gear drives which are mounted on support plate 41 of the tooling assembly. Gear wheel 70 is rigidly mounted on tailstock shaft 19 in alignment with a second gear wheel 71 mounted on upright plate 41. The several gears 70 and 71 are interconnected by an endless chain or belt. Gear wheel 71 is keyingly mounted on a common shaft 72 with another gear 73, as shown in FIGS. 1 and 7, and gears 70, 71 and 73 are preferably arranged in the same horizontal plane.

Another gear wheel 74 is mounted in tandem and in vertical alignment with gear 73 and is driven thereby (FIGS. 1 and 5). Gear 74 is keyingly mounted on a common mounting shaft with gear 75. The pitch diameter of gear 75 is approximately the same as the outside diameter of the workpiece in finally-tooled condition. Gear 76 having a pitch diameter equivalent to cylindrical surface 45a of external roll 45 is keyingly mounted on a common drive shaft with external upper roll 45. An idler gear 77 interconnects gears 75 and 76. Shaped roll 45 is thus driven at the proper peripheral speed by interconnecting gears 73, 74 ,75, 76 and 77. The aforesaid gear train operates to drive the smaller diameter shoulder portion 45a of roll 45 at essentially the same peripheral speed as the shoulder region of the finally-tooled workpiece.

Where roll 44 is driven by a positive rotative force rather than by frictional engagement with the workpiece, a gear 78 (FIG. 7) mounted on a common shaft with gear 73 is employed. Gear 78 has essentially the same pitch diameter as the nominal internal diameter of the workpiece. Gear 78 meshes with an intermediate idler gear 79 which in turn meshes with gear 80. Gear 80 has the same pitch diameter as the working diameter of internal working roll 44 as shown in FIG. 7. To permit roll 44 to be driven by frictional engagement with the workpiece internal surface, idler gear 79 is simply removed from the gear train.

Rolls 44 and 45 are shown in the drawings as driven by individual gear trains. However, either one or both rolls can be driven by a flexible drive shaft extending from tailstock shaft 19 and interconnecting with the rolls. One form of such driving means consists of driving outer roll 45 by a flexible shaft connected to a pair of gears similar to gears 75 and 76 having pitch diameters equivalent to the workpiece outer surface and the roll respectively. Such gears are mounted in tandem to interconnect with tailstock shaft 19.

In making larger sizes of flanged glass pipe, fittings and the like, such as 3, 4, and 6 inch internal diameters, it is contemplated that pairs of shaping rolls disposed in aligned relation may be utilized to contact the heat-softened end portion at diametrically opposed regions. An example of such arrangement employs a pair of similar inner rolls and a pair of similar external rolls disposed in vertical array with each member adapted to cooperate with its juxtaposed dissimilar member. An individual pair of rotatable rolls as described hereinabove thus contacts and forms the end portion at upper and lower regions during its rotation.

Rolls 44 and 45 and backup plate 47, all of which contact the plastic glass, are preferably comprised of a non-metallic, heat-resistant, self-lubricating material having an extremely low coefficient of friction. The material is capable of being formed with close tolerances and is resistant to wear at the required high operating temperatures, such as in forming heat-softened borosilicate or aluminosilicate glasses. The material which comprises the shaping members preferably consists of a carbon-graphite composition which is mechanically strong and durable having a close grain structure. One type of such material is sold and distributed under the trade name "Graphitar" by the United States Graphite Company, Saginaw, Michigan. This material is composed of purified carbon and graphite with the carbon content ranging from 95 to 99.8% with the balance consisting of oxides of aluminum, calcium, iron, magnesium and silicon. It is unaffected by heat under neutral or reducing conditions and oxidizes slowly at elevated temperatures being stable for prolonged use in working high-melting-point glasses such as borosilicates and aluminosilicates.

In the foregoing description internal roll 44 is described as right-cylindrical in shape. However, it is fully contemplated that roll 44 may have other contoured shapes such as being frusto-conical to permit internal tooling of inwardly or outwardly tapering inner surfaces. The tube end can thus be formed with precisely-uniform flaring or convergent internal contours. As described above, internal roll 44 is permitted to float during tooling to maintain the tube end with its original internal contour which may or may not be truly cylindrical. However, by permitting roll 44 to move in the direction of opposing roll 45 with sufficient movement to be limited by stop member 61, the glass can be formed with an exactly cylindrical inner contour. Under these conditions roll 44 has a lesser longitudinal extent substantially equivalent to only the heat-softened portion.

Various modifications may be resorted to within the spirit and scope of the appended claims.

I claim:

1. Apparatus for forming a thickened flange on the end portion of a heavy-walled tubular glass workpiece comprising, in combination, mounting means for retaining said workpiece in cantilevered relation, means for rotating said workpiece about its axis, means for heat-softening a projecting end portion of said workpiece into thermoplastic condition during its rotation, a pair of rotatable circular shaping members mounted in vertical array to forcibly engage opposing heat-softened internal and external surfaces of said end portion, said internal shaping member having a uniform end portion, said internal shaping member having a uniform cylindrical contour of substantially lesser diameter than said workpiece and having sufficient lineal extent to contact both heat-softened and rigid internal surfaces, means for positively rotating at least the external shaping member at essentially the same peripheral speed of rotation as the contacted external surface to form an exteriorly-projecting thickened flange, and a non-rotating transverse rigid end shaping means surrounding the internal shaping means and longitudinally movable with respect to the axis of the workpiece for forming a flange end surface having a greater width than the workpiece sidewall thickness.

2. The apparatus in accordance with claim 1 wherein the working surfaces of said shaping members are comprised of carbon-graphite containing material for self-lubricating formation of the heat-softened end portion of said workpiece.

3. The apparatus in accordance with claim 1, including a pair of support arms mounted in pivotal relation normal to said workpiece, each arm supporting one of said rotatable shaping members, a cam plate disposed in alignment with said pair of support arms, resilient means connected to each of said support arms adapted to retain its respective shaping member in pressurized contact with the prescribed glass surface, and means for moving said cam plate laterally to actuate pivotal movement of said arms and their respective shaping members into and out of contact with said workpiece.

4. Apparatus in accordance with claim 1 including common mounting means for said pair of rotatable shaping members and said laterally-movable non-rotating end shaping member, said internal shaping member having a right-cylindrical contour and said external shaping member having a substantially frusto-conical contour, said end shaping means consisting essentially of a flat plate having an annular projecting rib for forming an annular recess in said flange end surface.

References Cited in the file of this patent

UNITED STATES PATENTS

| | | |
|---|---|---|
| 1,897,487 | Millar | Feb. 14, 1933 |
| 2,266,417 | Eisler | Dec. 16, 1941 |
| 2,447,568 | Eisler | Aug. 24, 1948 |
| 2,811,813 | Paulson | Nov. 5, 1957 |

FOREIGN PATENTS

| | | |
|---|---|---|
| 768,135 | France | Feb. 5, 1934 |